United States Patent [19]

Frahm et al.

[11] 4,015,632
[45] Apr. 5, 1977

[54] VALVE CONSTRUCTION

[76] Inventors: Carl E. Frahm; Shirley E. Frahm, both of 1428 Oak Meadow Road, Arcadia, Calif. 91106

[22] Filed: Aug. 18, 1975

[21] Appl. No.: 605,431

[52] U.S. Cl. ............................... 137/801; 251/321; 251/282
[51] Int. Cl.² .......................................... F16K 1/32
[58] Field of Search ........... 137/801; 251/155, 322, 251/321, 282

[56] References Cited

UNITED STATES PATENTS

| | | | |
|---|---|---|---|
| 2,634,757 | 4/1953 | Houghton | 251/155 X |
| 3,539,151 | 11/1970 | Reid | 137/801 |
| 3,730,224 | 5/1973 | Prisk | 251/322 X |

Primary Examiner—Alan Cohan
Attorney, Agent, or Firm—Frank E. Mauritz

[57] ABSTRACT

A water spigot has a quickly attachable and detachable nozzle for sanitary, assembly and constructional purposes. The nozzle besides producing a uniform flow denys access to the valve element and its actuator thereby greatly minimizing possibility of contamination which otherwise exists by persons who are inclined to touch the valve element and/or its actuator in prior art spigots. The nozzle is quickly attachable and detachable for assembly purposes and testing in original manufacture and, if desired, in subsequent repair. The construction is such that the valve actuator, in the form of a wire, is no longer required to be as long as in prior art spigots thereby minimizing mechanical problems and resulting in a more trouble free sanitary spigot.

1 Claim, 5 Drawing Figures

VALVE CONSTRUCTION

The present invention relates to valves of the type commonly referred to as faucets or spigots, and particularly for withdrawing liquids from containers at relatively low pressures, such as water coolers, wine barrels, and the like and is an improvement in the type of valves disclosed in U.S. Pat. No. 2,288,954 of Otto S. Reid and U.S. Pat. No. 3,539,151 of Otto S. Reid and Carl E. Frahm.

An object of the invention is to provide simple and rugged spigot construction which is more reliable and trouble-free.

A specific object of the present invention is to provide an improved spigot which, in contrast to the two commercial valves illustrated in the two above patents, requires a much shorter wire actuating element thereby minimizing alignment and wire bending problems; provides ready access to the valve closure plug on such wire element so that it may be easily assembled and the spigot tested in original manufacture and, if desired, after subsequent use; provides protection against users touching the valve plug or its actuator thereby greatly minimizing contamination problems and enhancing health conditions; provides greater convenience for moving the valve plug to open position; and provides for more predictable and controlled water flow once the valve plug is moved from its seat.

Other more specific objects and features of the invention will become apparent from the following detailed description of a particular embodiment of the invention, the description referring to the drawing in which FIG. 1 is a view in front elevation of a spigot embodying features of the present invention.

Figure 1:
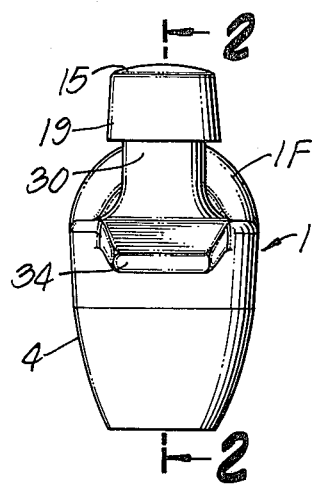
Figure 4:
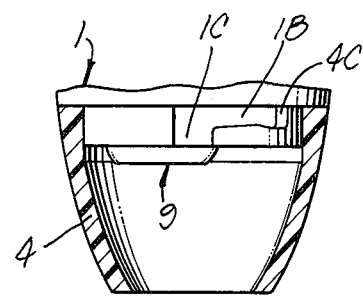
FIG. 4 is a sectional view illustrating details of the bogonet type of connection between the lower detachable protective nozzle and the upper spigot casing.
Figure 2:
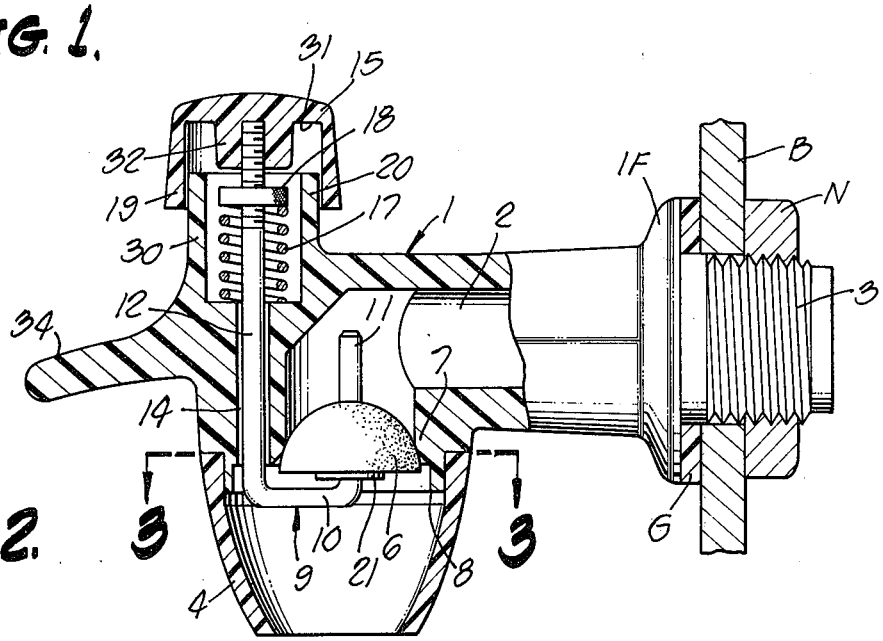
FIG. 2 is a sectional view taken substantially as indicated by line 2—2 in FIG. 1.
Figure 3:
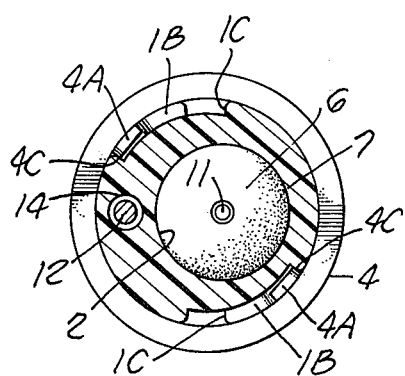
FIG. 3 is a sectional view taken substantially as indicated by line 3—3 in FIG. 2.

Referring to FIG. 2 the spigot therein disclosed comprises a body member 1 having a fluid passage 2 extending thereinto from one end. This end of the body member may be externally threaded as indicated at 3 for insertion into a bottle B or the like with a gasket G sandwiched between the flange 1F and nut N threaded on portion 3. The fluid passage 2 extends to a point adjacent the forward end of the body member 1, where it makes a right angle bend and merges from the underside of the body member. At this point there is attached to the body member 1 a discharge nozzle 4 which extends downwardly, the nozzle 4 being releasably attached to the body member 1.

The lower end of the passage 2 is normally closed by a plug 6 of rubber or similar material which seals against a seat 7 at the lower end of the passage 2. The lower end of the passage wall is cut away on the inside to permit the plug 6 to enter upwardly below the extreme lower lip 8 thereof. The plug 6 is supported on a wire element 9 which extends therethrough. Thus the wire element 9 has a lower horizontal section 10 which merges at one end into a vertical section 11 extending through plug 6 and merges at the other end into an upwardly extending section 12. The section 12 extends upwardly through a passage 14 in the body member 1 adjacent to the passage 2 therein. The section 12 of the rod extends upwardly above the body member 1 a substantial distance and has mounted on its upper end a thumbpiece 15. Thus the thumbpiece 15 may be screwed onto the threaded upper end of the section 12 of the rod. To normally maintain the rod 9 in uppermost position in which the plug 6 closes the end of the spout, a helical spring 17 is compressed between the upper side of the body member 1 and a nut 18 on the upper end of the section 12 of the rod, this spring 17 surrounding the rod.

In order to protect and conceal the spring 17, it is enclosed within a skirt member 19 depending downwardly from the thumbpiece 15 in overlapping relation with a tubular portion 20 of body 1.

A thin metal disc 21 is preferably mounted underneath the plug 6 to give it better support from the horizontal section 10 of the rod 9.

The passage 14 guides the vertical section 12 of the rod 9 for vertical longitudinal motion, but it does not prevent rotation of the rod section 12. Such rotation would be objectionable in that it might carry the plug 6 out of registration with the spout member 4 while the valve is in open position. However such disaligning motion is prevented by extending the vertical section 11 of rod 9 a substantial distance from the plug 6 into the passage 2 and prevents any objectionable swinging movement of the plug 6 about the rod section 12 as an axis.

Downward movement of thumbpiece 15 is limited by engagement of the upper end of the cylindrical casing portion 30, which encircles spring 17, with the inner cylindrical surface 31 of thumbpiece 15 and additional stability or alignment is imparted by permissive contact of the outer surface of casing portion 30 with the inner wall of skirt 19 and/or engagement of the inner wall of portion 30 with the outer circular wall of the cylindrical boss 32 into which the rod 12 is threaded.

A generally rectangular extension 34 of casing 1 is advantageously used in opening the valve with a person using his thumb to depress the thumbpiece 15 against the action of spring 15 while simultaneously positioning his fore finger under such extension 34.

Figure 5:
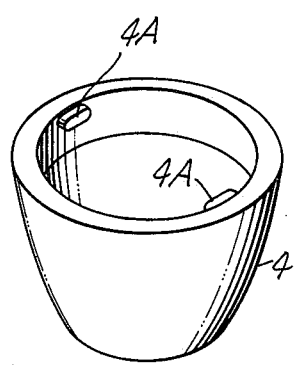
FIG. 5 is a perspective view of the lower protective nozzle.

The nozzle 4 is generally sphero-conical as illustrated in FIG. 5 and includes a pair of inner projections 4A each of which is insertable into a corresponding bayonet type slot 1B through opening 1C in casing 1 leading thereto. The closed end of the circumferentially extending slot 1B is enlarged somewhat to provide an abutment or shoulder 4C behind which the projections 4A may fall when the nozzle is turned to thereby provide some difficulty, however not unsurmountable difficulty, for persons to remove the nozzle 4.

It will thus be seen that this construction provides a much shorter length of wire actuator 9 with the nozzle 4 providing an additional useful and practical dimension for the spigot without the necessity of providing a wire guide through such nozzle 4 as in the spout disclosed in the two above referenced patents. The nozzle 4 is thus truly a nozzle which extends a considerable distance below the plug 6 to perform two important functions, namely to assure a predictable and generally circular stream of water when the plug 6 is moved downwardly from its seat and also to provide a protective shield around the valve plug 6 and actuator 9 thereby preventing one from being allowed to make finger contact with either the plug 6 and/or actuator 9 and thus eliminating a possible source of contamination and an unhealthy condition.

This nozzle 4 is preferably releasably connected so as to allow persons to assemble and test the spigot in original production.

We claim:

1. A spigot comprising: a body member with an orifice at the end thereof, a plug member, and means for moving said plug member between a first position against said orifice in sealing relation therewith a second position spaced from said orifice to permit fluid flow therethrough, a nozzle, means attachably mounting said nozzle on said body member in communication with said orifice to control fluid flow from said orifice, said nozzle when mounted on said body member extending around said plug member to prevent access to said plug member, said plug member moving means being mounted exclusively in said body member such that said nozzle may be attached without engagement with said plug member moving means, a thumb piece, said plug member actuating means extending beyond said body member and terminating in said thumb piece engageable by a person's thumb, a projection extending from such body member engageable by a person's finger when simultaneously the person's thumb engages said thumb piece, said plug member moving means including a wire element that has a vertical portion extending through an elongated opening in said body member and a bent horizontal portion on which said plug member is mounted, said body member having an upper cylindrical portion through which said wire element extends, said wire element having a threaded portion in its upper end, a coil compression spring within said cylindrical portion and having one of its ends engaging said body member, a nut on said threaded portion engaging the other end of said spring, said thumb piece having a threaded portion engaging said threaded portion of said wire element, said thumb piece having a cylindrical skirt portion encircling said body cylindrical portion, and said thumb piece having a portion engageable with said body cylindrical portion engageable with said body cylindrical portion to limit movement of said thumb piece.

* * * * *